US009794896B2

(12) United States Patent
Zhang et al.

(10) Patent No.: US 9,794,896 B2
(45) Date of Patent: Oct. 17, 2017

(54) METHOD AND DEVICE FOR ADJUSTING STATE OF WIRELESS NETWORK

(71) Applicant: Xiaomi Inc., Beijing (CN)

(72) Inventors: Pengfei Zhang, Beijing (CN); Yong Chen, Beijing (CN); Heng Qu, Beijing (CN); Tiejun Liu, Beijing (CN); Fangcheng Pang, Beijing (CN)

(73) Assignee: Xiaomi Inc., Beijing (CN)

( * ) Notice: Subject to any disclaimer, the term of this patent is extended or adjusted under 35 U.S.C. 154(b) by 99 days.

(21) Appl. No.: 14/822,016

(22) Filed: Aug. 10, 2015

(65) Prior Publication Data

US 2016/0057713 A1 Feb. 25, 2016

Related U.S. Application Data

(63) Continuation of application No. PCT/CN2015/071855, filed on Jan. 29, 2015.

(30) Foreign Application Priority Data

Aug. 19, 2014 (CN) .......................... 2014 1 0409378

(51) Int. Cl.
*H04M 3/00* (2006.01)
*H04W 52/38* (2009.01)
(Continued)

(52) U.S. Cl.
CPC ........ *H04W 52/386* (2013.01); *H04B 17/309* (2015.01); *H04B 17/318* (2015.01);
(Continued)

(58) Field of Classification Search
CPC ............. H04W 52/386; H04W 40/248; H04W 40/246; H04W 76/028; H04W 28/18; H04W 24/02; H04B 17/309; H04B 17/318
(Continued)

(56) References Cited

U.S. PATENT DOCUMENTS

| 2004/0127208 A1* | 7/2004 | Nair ...................... H04W 36/14 455/420 |
| 2005/0030924 A1 | 2/2005 | Yano et al. |
| 2005/0058062 A1 | 3/2005 | Rudolf et al. |
| 2007/0263574 A1* | 11/2007 | Lu ...................... H04W 52/0261 370/338 |

(Continued)

FOREIGN PATENT DOCUMENTS

| CN | 1568043 A | 1/2005 |
| CN | 1802864 A | 7/2006 |

(Continued)

OTHER PUBLICATIONS

International Search Report of PCT/CN2015/071855, from the State Intellectual Property Office of China, mailed May 27, 2015.

(Continued)

*Primary Examiner* — Shahriar Behnamian
(74) *Attorney, Agent, or Firm* — Finnegan, Henderson, Farabow, Garrett & Dunner LLP

(57) ABSTRACT

A method for a wireless router to adjust a state of a wireless network provided by the wireless router, includes: monitoring whether the state of the wireless network satisfies an adjusting condition of adjusting the state of the wireless network; when the state of the wireless network satisfies the adjusting condition, sending an adjusting prompt to a wireless terminal, the adjusting prompt being configured to ask for user permission to adjust the state of the wireless network; and if the wireless router receives from the wireless terminal an acceptance instruction to accept the adjusting, adjusting the state of the wireless network.

15 Claims, 7 Drawing Sheets

(51) Int. Cl.
  *H04B 17/318*  (2015.01)
  *H04W 76/02*  (2009.01)
  *H04B 17/309*  (2015.01)
  *H04W 40/24*  (2009.01)
  *H04W 24/02*  (2009.01)
  *H04W 28/18*  (2009.01)

(52) U.S. Cl.
  CPC ....... *H04W 40/246* (2013.01); *H04W 40/248* (2013.01); *H04W 76/028* (2013.01); *H04W 24/02* (2013.01); *H04W 28/18* (2013.01)

(58) Field of Classification Search
  USPC .................................................. 455/418–420
  See application file for complete search history.

(56) References Cited

U.S. PATENT DOCUMENTS

| | | | | |
|---|---|---|---|---|
| 2008/0075038 | A1* | 3/2008 | Jin | H04W 16/14 370/329 |
| 2010/0002883 | A1 | 1/2010 | Sammour et al. | |
| 2015/0373077 | A1* | 12/2015 | Ramamurthi | H04W 36/14 709/219 |

FOREIGN PATENT DOCUMENTS

| | | |
|---|---|---|
| CN | 1929416 A | 3/2007 |
| CN | 101465678 A | 6/2009 |
| CN | 102131265 A | 7/2011 |
| CN | 102724727 A | 10/2012 |
| CN | 103582053 A | 2/2014 |
| CN | 103686881 A | 3/2014 |
| CN | 103796263 A | 5/2014 |
| CN | 103987113 A | 8/2014 |
| CN | 104185235 A | 12/2014 |
| EP | 2695237 AO | 2/2014 |
| JP | 2004-112225 A | 4/2004 |
| JP | 2004-266330 A | 9/2004 |
| JP | 2010-087915 A | 4/2010 |
| JP | 2011-217035 A | 10/2011 |
| JP | 2012-175275 A | 9/2012 |
| JP | 2014-131285 A | 7/2014 |
| KR | 20130026657 A | 3/2013 |
| RU | 2446570 C2 | 3/2012 |
| WO | WO 2012/139077 | 10/2012 |

OTHER PUBLICATIONS

"*Universal Mobile Telecommunications System*" ETSI, ETSI TR 125 967 V9.0.0 (3GPP TS 25.967 V9.0.0), pp. 1-55, Feb., 2010.
English version of International Search Report for PCT/CN2015/071855, from the State Intellectual Property Office of China, dated May 27, 2015.
Extended European Search Report for European Application No. EP 15180999.3 from the European Patent Office, dated Dec. 1, 2015.
Notification on Patentability Check Results dated Sep. 7, 2016, in counterpart Russian Application No. 2015123122/08(036094) and English translation thereof.

* cited by examiner

METHOD AND DEVICE FOR ADJUSTING STATE OF WIRELESS NETWORK

CROSS-REFERENCE TO RELATED APPLICATIONS

This application is a continuation of International Application No. PCT/CN2015/071855, filed Jan. 29, 2015, which is based upon and claims priority to Chinese Patent Application No. 201410409378.7, filed Aug. 19, 2014, the entire content of all of which are incorporated herein by reference.

TECHNICAL FIELD

The present disclosure generally relates to the field of network technologies and, more particularly, to a method and a device for adjusting a state of a wireless network.

BACKGROUND

Conventionally, a wireless router can be used for providing wireless access to a network. For example, the wireless router can provide wireless access to a broadband network to wireless terminals supporting WiFi, e.g., a laptop computer, a mobile phone, and the like, through a wireless network of the wireless router.

SUMMARY

According to a first aspect of the present disclosure, there is provided a method for a wireless router to adjust a state of a wireless network provided by the wireless router, comprising: monitoring whether the state of the wireless network satisfies an adjusting condition of adjusting the state of the wireless network; when the state of the wireless network satisfies the adjusting condition, sending an adjusting prompt to a wireless terminal, the adjusting prompt being configured to ask for user permission to adjust the state of the wireless network; and if the wireless router receives from the wireless terminal an acceptance instruction to accept the adjusting, adjusting the state of the wireless network.

According to a second aspect of the present disclosure, there is provided a device for providing a wireless network, comprising: a processor; and a memory for storing instructions executable by the processor, wherein the processor is configured to: monitor whether a state of the wireless network satisfies an adjusting condition of adjusting the state of the wireless network; when the state of the wireless network satisfies the adjusting condition, send an adjusting prompt to a wireless terminal, the adjusting prompt being configured to ask for user permission to adjust the state of the wireless network; and if the device receives from the wireless terminal an acceptance instruction to accept the adjusting, adjust the state of the wireless network.

According to a third aspect of the present disclosure, there is provided a non-transitory storage medium having stored therein instructions that, when executed by one or more processors of a wireless router providing a wireless network, cause the wireless router to perform: monitoring whether a state of the wireless network satisfies an adjusting condition of adjusting the state of the wireless network; when the state of the wireless network satisfies the adjusting condition, sending an adjusting prompt to a wireless terminal, the adjusting prompt being configured to ask for user permission to adjust the state of the wireless network; and if the wireless router receives from the wireless terminal an acceptance instruction to accept the adjusting, adjusting the state of the wireless network.

It is to be understood that both the foregoing general description and the following detailed description are exemplary and explanatory only and do not limit the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with some aspects related to the disclosure as recited in the appended claims.

Figure 1:
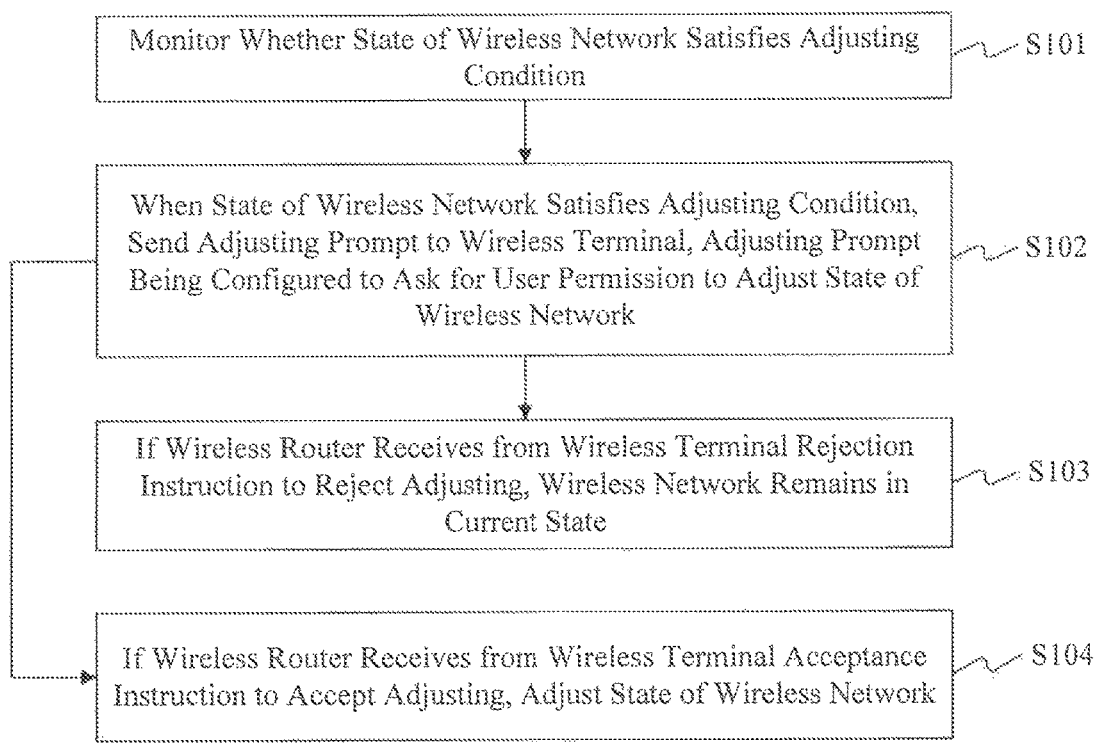
FIG. 1 is a flow chart of a method for adjusting a state of a wireless network, according to an exemplary embodiment.

FIG. 1 is a flow chart of a method 100 for adjusting a state of a wireless network, according to an exemplary embodiment. For example, the method 100 is used in a wireless router providing the wireless network. Referring to FIG. 1, the method 100 includes the following steps.

In step S101, whether a state of the wireless network satisfies an adjusting condition for adjusting the state of the wireless network is monitored.

In one exemplary embodiment, the adjusting condition may be a first condition that a channel quality of the wireless network currently used is lower than a preset channel quality. The preset channel quality may be represented by a preset value of each of one or more channel parameters, such as a transmission speed, a signal to noise ratio, a channel gain, a noise power, a multipath fading, and the like. For example, assuming that the preset channel quality is that the transmission speed is equal to X1, if the transmission speed is lower than X1, the quality of the wireless network channel currently used is determined to be lower than the preset channel quality.

In one exemplary embodiment, the adjusting condition may be a second condition that a monitored signal intensity of a signal received from a wireless terminal is lower than a preset signal intensity. In the embodiment, the preset signal intensity may be set by a user according to requirements or by system.

In one exemplary embodiment, the adjusting condition may be a third condition that a monitored signal intensity of a signal transmitted by the wireless router is larger than a minimum signal intensity required by a space where the wireless router is located. For example, when the space where the wireless router is located is small, the wireless router can communicate with the wireless terminal by transmitting the signal with a low signal intensity. Also for example, when the space where the wireless router is located is large, the wireless router can communicate with the wireless terminal by transmitting the signal with a high signal intensity. In the embodiment, a size of the space where the wireless router is located may be determined in advance, e.g., by using image detecting technologies, and the minimum signal intensity of the signal transmitted by the wireless router required by the space may be determined according to the size of the space. For example, the minimum signal intensity of the signal transmitted by the wireless router may be determined according to empirical data.

In step S102, when the state of the wireless network satisfies the adjusting condition, an adjusting prompt is sent to the wireless terminal, the adjusting prompt being configured to ask for user permission to adjust the state of the wireless network.

In one exemplary embodiment, the adjusting prompt is displayed on the wireless terminal as a query message, for example, "whether to adjust the state of the wireless network," and the like.

In one exemplary embodiment, when the state of the wireless network does not satisfy the adjusting condition, the wireless network remains in the current state.

In one exemplary embodiment, the user can select one or more of the first, second, and third conditions from the wireless terminal. The adjusting prompt is sent to the wireless terminal when the state of the wireless network satisfies the one or more adjusting conditions.

In step S103, if the wireless router receives from the wireless terminal a rejection instruction to reject adjusting the state of the wireless network, the wireless network remains in the current state.

In one exemplary embodiment, after the adjusting prompt is sent to the wireless terminal, the wireless terminal displays the adjusting prompt to the user of the wireless terminal. The user can input a selection on the wireless terminal after viewing the adjusting prompt. For example, when the user selects a "yes" option, the wireless terminal may determine that the user accepts adjusting the state of the wireless network, and then send an acceptance instruction to accept the adjusting to the wireless router. Also for example, when the user selects a "no" option, the wireless terminal may determine that the user does not accept adjusting the state of the wireless network, and then send a rejection instruction to reject the adjusting to the wireless router.

When the wireless router receives from the wireless terminal the rejection instruction to reject the adjusting, the wireless network maintains the current state, so as to avoid affecting the normal use of the wireless network.

In step S104, if the wireless router receives from the wireless terminal the acceptance instruction to accept the adjusting, the state of the wireless network is adjusted.

In one exemplary embodiment, the state of the wireless network satisfies the first condition that the channel quality of the wireless network currently used is lower than the preset channel quality. Accordingly, when the wireless router receives from the wireless terminal the acceptance instruction to accept the adjusting, the wireless router switches a first communication channel currently used into a second communication channel, and reestablishes a connection with the wireless terminal. As a result, communication quality is improved.

In one exemplary embodiment, the state of the wireless network satisfies the second condition that the monitored signal intensity of the signal received from the wireless terminal is lower than the preset signal intensity. Accordingly, when the wireless router receives from the wireless terminal the acceptance instruction to accept the adjusting, the wireless router increases the signal intensity of the signal transmitted by the wireless router to a preset value. For example, when the monitored signal intensity of the signal received from the wireless terminal is small, it indicates that the signal quality of the signal received by the wireless terminal from the wireless router is poor. To improve the signal quality of the signal received by the wireless terminal from the wireless router, the wireless router can increase the signal intensity of the signal transmitted by the wireless router to the preset value, so that the signal quality of the signal received by the wireless terminal is improved.

In one exemplary embodiment, the state of the wireless network satisfies the third condition that the monitored signal intensity of the signal transmitted by the wireless router is larger than the minimum signal intensity required by the space where the wireless router is located. Accordingly, when the wireless router receives from the wireless terminal the acceptance instruction to accept the adjusting, the wireless router decreases the signal intensity of the signal transmitted by the wireless router, to be equal to or larger than the minimum signal intensity required by the space, thereby reducing unnecessary energy use in normal operation.

In one exemplary embodiment, in addition to the query message, the adjusting prompt may further include additional information, such as state information of the wireless network and adjusting result information, to improve user experience. For example, the state information of the wireless network may be a numbering of the communication channel currently used, a current signal intensity of the signal transmitted by the wireless router, a size of the space where the wireless router is located, a signal intensity of the signal received from the wireless terminal, and the like. Also for example, the adjusting result information may be a numbering of the communication channel to be used after the adjusting, and the signal intensity of the signal transmitted by the wireless router after the adjusting.

In exemplary embodiments, the wireless terminal may be a laptop computer supporting WiFi, a tablet computer supporting WiFi, a mobile phone supporting WiFi, and the like.

The method 100 may remind a user whether to adjust the state of the wireless network, and determine whether to adjust the state of the wireless network according to the instruction from the user, thus improving user experience.

Figure 2:
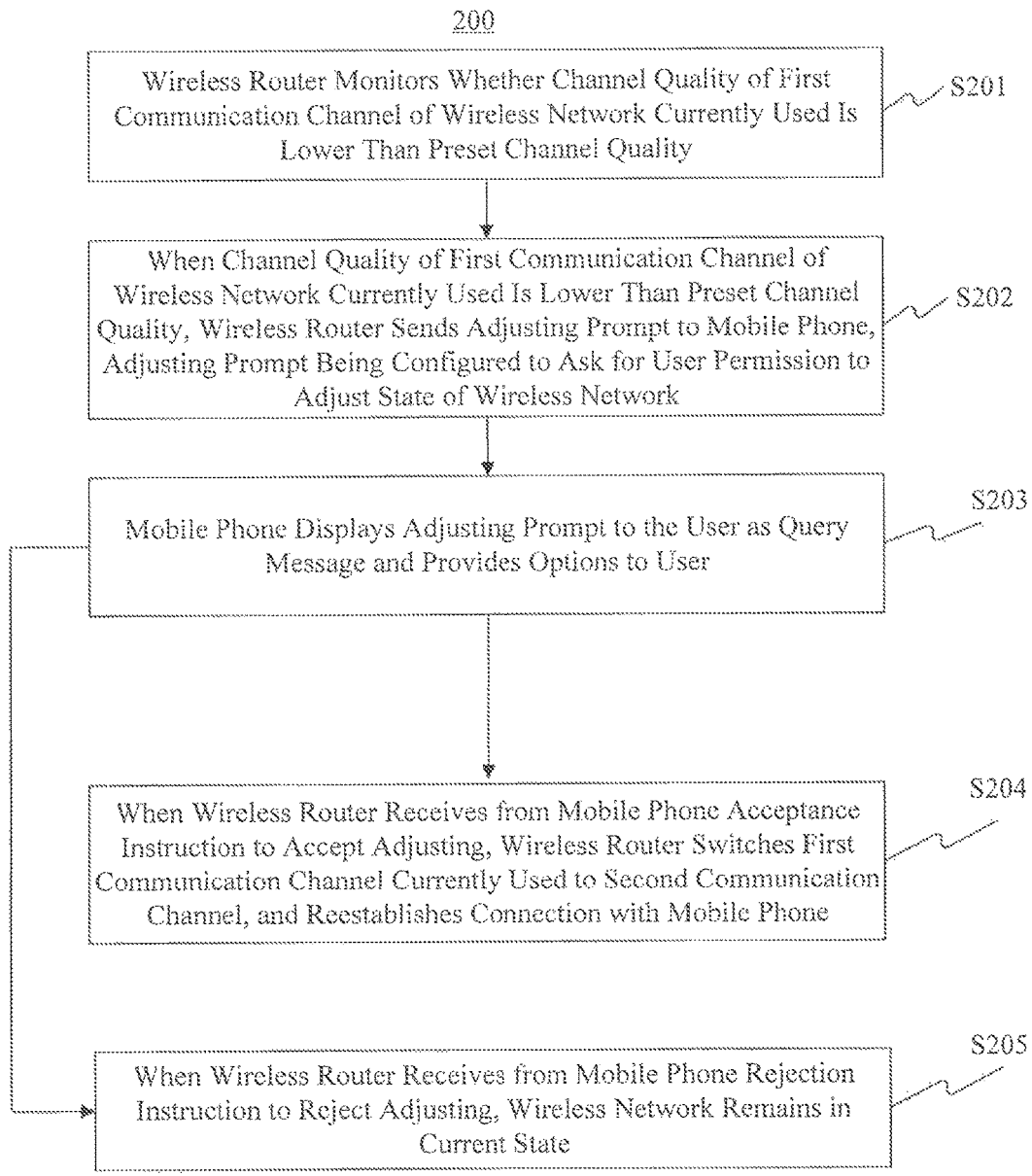
FIG. 2 is a flow chart of a method for adjusting a state of a wireless network, according to an exemplary embodiment.

FIG. 2 is a flow chart of a method 200 for adjusting a state of a wireless network, according to an exemplary embodiment. For example, the method 200 is used in a wireless router providing the wireless network. Referring to FIG. 2, the method 200 includes the following steps.

In step S201, the wireless router monitors whether a channel quality of a first communication channel of the wireless network currently used to communicate with a mobile phone is lower than a preset channel quality. If so, step S202 is performed, otherwise, the wireless network remains in the current state, i.e., the first communication channel continues to be used.

In step S202, when the channel quality of the first communication channel of the wireless network currently used is lower than the preset channel quality, the wireless router sends an adjusting prompt to the mobile phone, the adjusting prompt being configured to ask for user permission to adjust the state of the wireless network.

In exemplary embodiment, the adjusting prompt may further include additional information such as state information of the wireless network and adjusting result information.

In step S203, the mobile phone displays the adjusting prompt to a user as a query message, e.g., "whether to adjust the state of the wireless network," and provides, e.g., "yes" and "no" options to the user. The mobile phone may also display the additional information such as the state information of the wireless network and the adjusting result information. If the user selects the "yes" option, the mobile phone sends an acceptance instruction to accept adjusting the state of the wireless network to the wireless router, and step S204 is performed subsequently. If the user selects the "no" option, the mobile phone sends a rejection instruction to reject the adjusting to the wireless router, and step S205 is performed subsequently.

In step S204, when the wireless router receives from the mobile phone the acceptance instruction to accept the adjusting, the wireless router switches the first communication channel currently used to a second communication channel, and reestablishes a connection with the mobile phone.

In step S205, when the wireless router receives from the mobile phone the rejection instruction to reject the adjusting, the wireless network remains in the current state, i.e., the first communication channel continues to be used.

Figure 3:
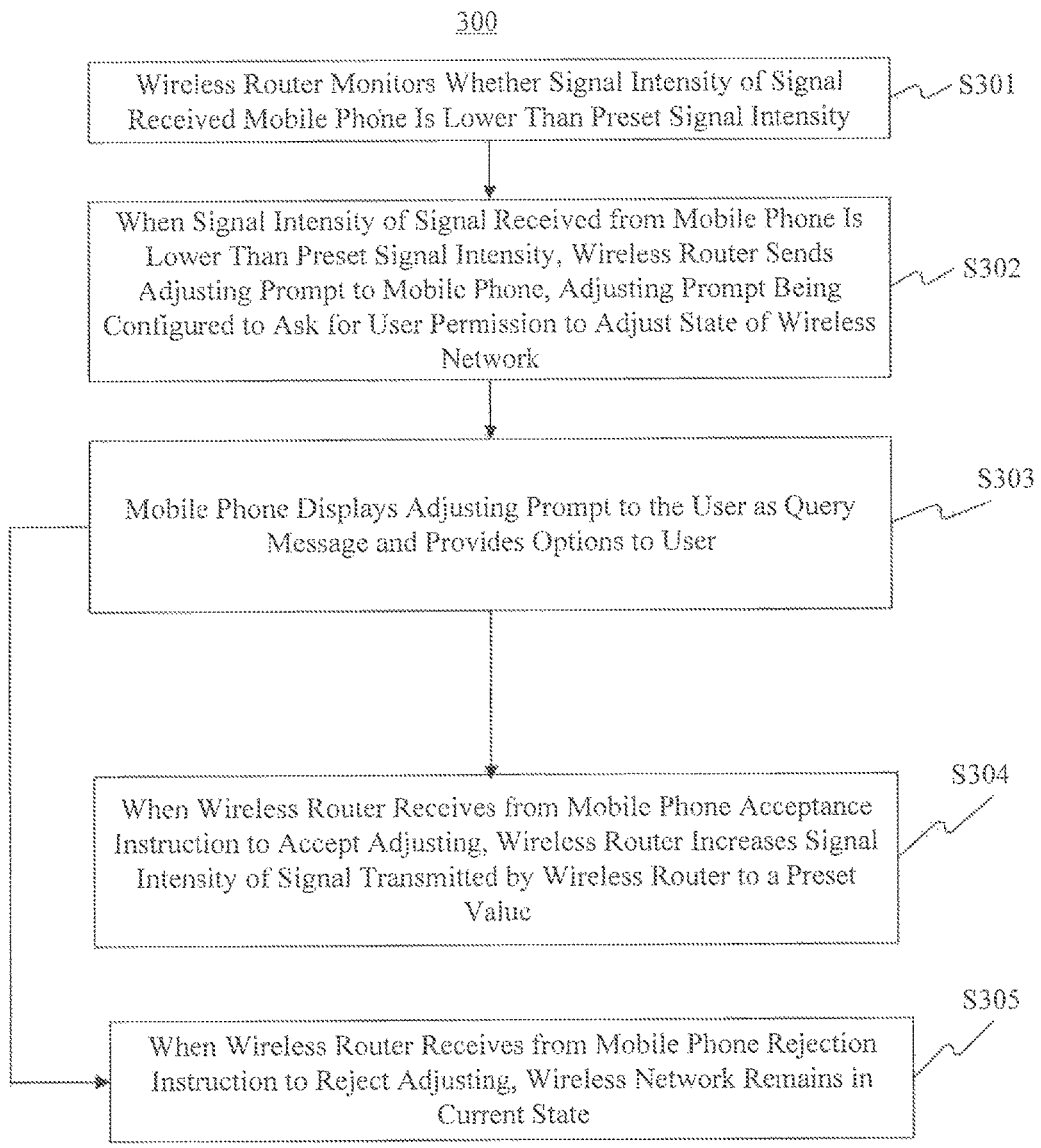
FIG. 3 is a flow chart of a method for adjusting a state of a wireless network, according to an exemplary embodiment.

FIG. 3 is a flow chart of a method 300 for adjusting a state of a wireless network, according to an exemplary embodiment. For example, the method 300 is used in a wireless router providing the wireless network. Referring to FIG. 3, the method 300 includes the following steps.

In step S301, the wireless router monitors whether a signal intensity of a signal received from a mobile phone is lower than a preset signal intensity. If so, step S302 is performed, otherwise, the wireless network remains in the current state.

In step S302, when the signal intensity of the signal received from the mobile phone is lower than the preset signal intensity, the wireless router sends an adjusting prompt to the mobile phone, the adjusting prompt being configured to ask for user permission to adjust the state of the wireless network.

In one exemplary embodiment, the adjusting prompt may further include additional information, such as state information of the wireless network and adjusting result information.

In step S303, the mobile phone displays the adjusting prompt to a user as a query message, e.g., "whether to adjust the state of the wireless network," and provides, e.g., "yes" and "no" options to the user. The mobile phone may also display the additional information such as the state information of the wireless network and the adjusting result information. If the user selects the "yes" option, the mobile phone sends an acceptance instruction to accept adjusting the state of the wireless network to the wireless router, and step S304 is performed subsequently. If the user selects "no" option, the mobile phone sends a rejection instruction to reject the adjusting to the wireless router, and step S305 is performed subsequently.

In step S304, when the wireless router receives from the mobile phone the acceptance instruction to accept the adjusting, the wireless router increases a signal intensity of a signal transmitted by the wireless router to a preset value.

In step S305, when the wireless router receives from the mobile phone the rejection instruction to reject the adjusting, the wireless network remains in the current state, i.e., the signal intensity of the signal transmitted by the wireless router remains unchanged.

Figure 4:
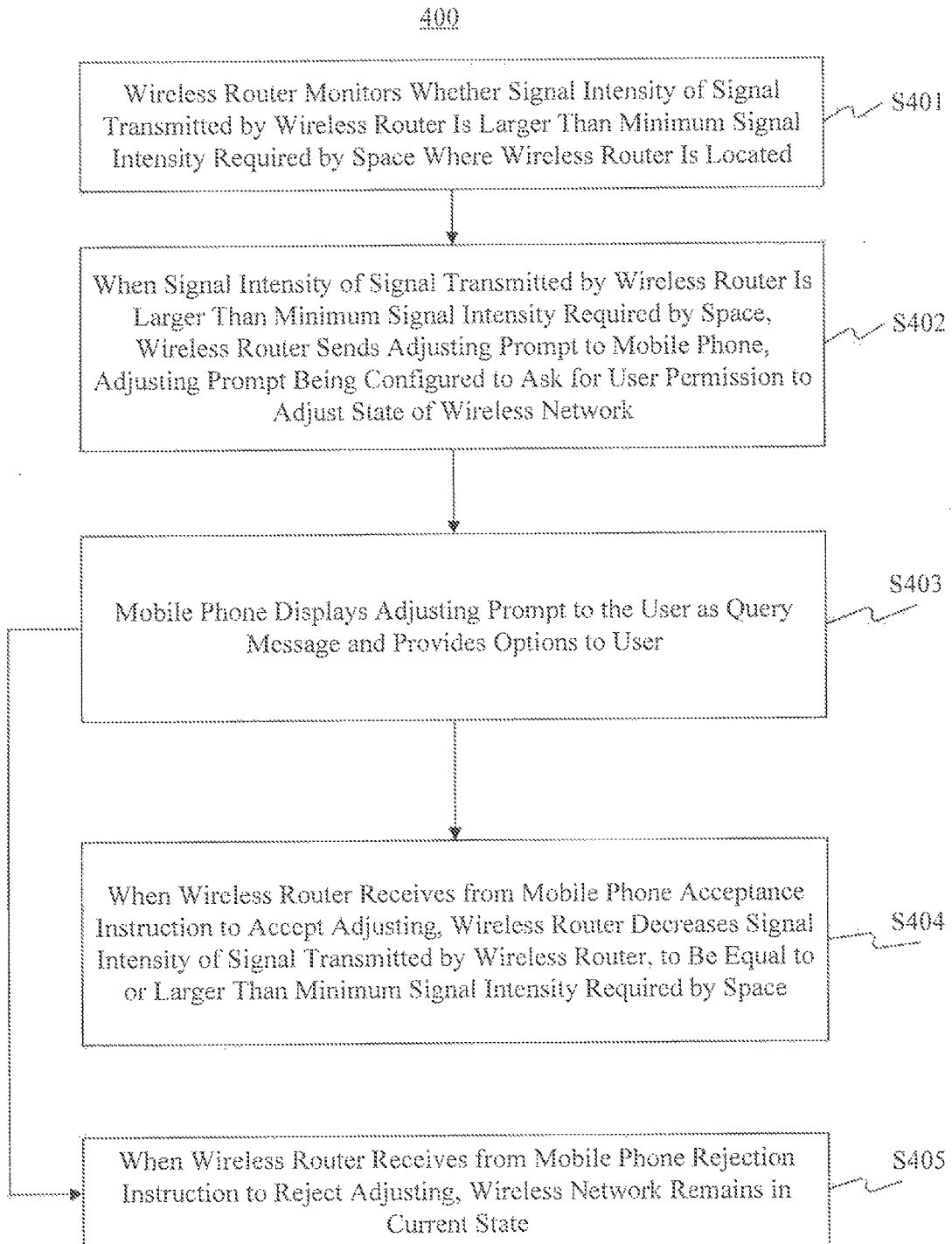
FIG. 4 is a flow chart of a method for adjusting a state of a wireless network, according to an exemplary embodiment.

FIG. 4 is a flow chart of a method 400 for adjusting a state of a wireless network, according to an exemplary embodiment. For example, the method 400 is used in a wireless router providing the wireless network. Referring to FIG. 4, the method 400 includes the following steps.

In step S401, the wireless router monitors whether a signal intensity of a signal transmitted by the wireless router is larger than a minimum signal intensity required by a space where the wireless router is located. If so, step S402 is performed, otherwise, the wireless network remains in the current state.

In step S402, when the signal intensity of the signal transmitted by the wireless router is larger than the minimum signal intensity required by the space where the wireless router is located, the wireless router sends an adjusting prompt to a mobile phone, the adjusting prompt being configured to ask for user permission to adjust the state of the wireless network.

In exemplary embodiment, the adjusting prompt may further include additional information such as state information of the wireless network and adjusting result information.

In step S403, the mobile phone displays the adjusting prompt to a user as a query message, e.g., "whether to adjust the state of the wireless network," and provides, e.g., "yes" and "no" options to the user. The mobile phone may also display the additional information such as the state information of the wireless network and the adjusting result information. If the user selects "yes" option, the mobile phone sends an acceptance instruction to accept adjusting the state of the wireless network to the wireless router, and step S404 is performed subsequently. If the user selects the "no" option, the mobile phone sends a rejection instruction to reject the adjusting to the wireless router, and step S405 is performed subsequently.

In step S404, when the wireless router receives from the mobile phone the acceptance instruction to accept the adjusting, the wireless router decreases the signal intensity of the signal transmitted by the wireless router, to be equal to or larger than the minimum signal intensity required by the space where the wireless router is located.

In step S405, when the wireless router receives from the mobile phone the rejection instruction to reject the adjusting, the wireless network remains in the current state, i.e., the signal intensity of the signal transmitted by the wireless router remains unchanged.

Figure 5:
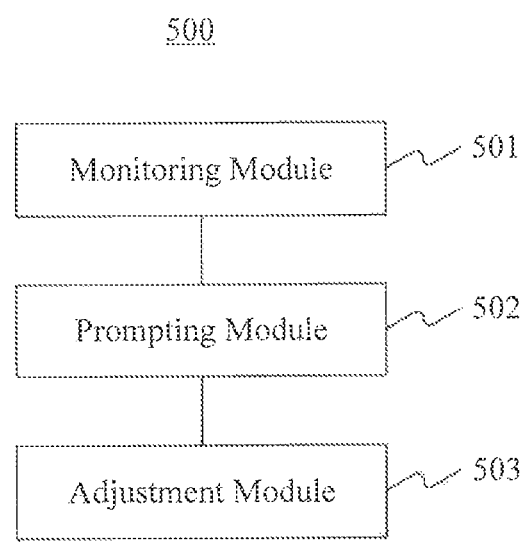
FIG. 5 is a block diagram of a device for adjusting a state of a wireless network, according to an exemplary embodiment.

FIG. 5 is a block diagram of a device 500 for adjusting a state of a wireless network, according to an exemplary embodiment. For example, the device 500 may be a part of a wireless router or the whole wireless router, and may be implemented by software, or hardware, or a combination of software and hardware.

Referring to FIG. 5, the device 500 includes a monitoring module 501 configured to monitor whether the state of the wireless network satisfies an adjusting condition; a prompting module 502 configured to, when the state of the wireless network satisfies the adjusting condition, send an adjusting prompt to a wireless terminal, the adjusting prompt being configured to ask for user permission to adjust the state of the wireless network; and an adjustment module 503 configured to, when the device receives from the wireless terminal an acceptance instruction to accept adjusting the state of the wireless network, adjust the state of the wireless network.

Figure 6:
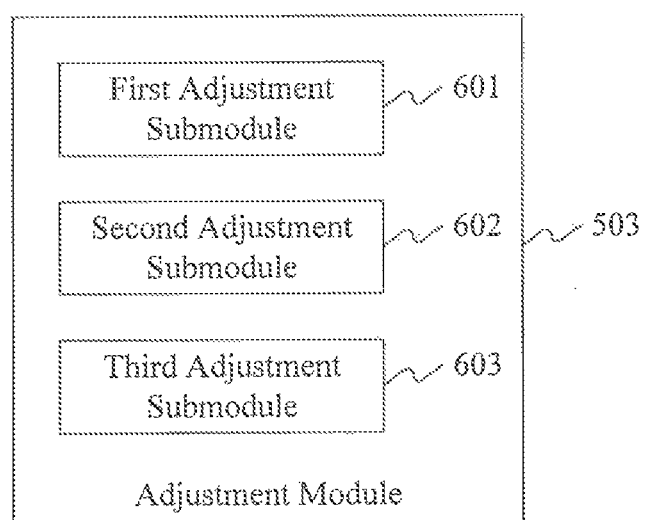
FIG. 6 is a block diagram of an adjustment module, according to an exemplary embodiment.

FIG. 6 is a block diagram of the adjustment module 503, according to an exemplary embodiment. Referring to FIG. 6, the adjustment module 503 includes a first adjustment submodule 601, a second adjustment submodule 602, and a third adjustment submodule 603.

The first adjustment submodule 601 is configured to, when the adjusting condition is that a channel quality of the wireless network currently used is lower than a preset channel quality and when the device 500 receives from the wireless terminal the acceptance instruction to accept the adjusting, switch a first communication channel currently used to a second communication channel, and reestablish a connection with the wireless terminal on the second communication channel.

The second adjustment submodule 602 is configured to, when the adjusting condition is that a monitored signal intensity of a signal received from the wireless terminal is lower than a preset signal intensity and when the device 500 receives from the wireless terminal the acceptance instruction to accept the adjusting, increase the signal intensity of the signal transmitted by the device 500 to a preset value.

The third adjustment submodule 603 is configured to, when the adjusting condition is that a monitored signal intensity of a signal transmitted by the device 500 is larger than a minimum signal intensity required by a space where the device 500 is located and when the device 500 receives from the wireless terminal the acceptance instruction to accept the adjusting, decrease the signal intensity of the signal transmitted by the device 500, to be equal to or larger than the minimum signal intensity.

Figure 7:
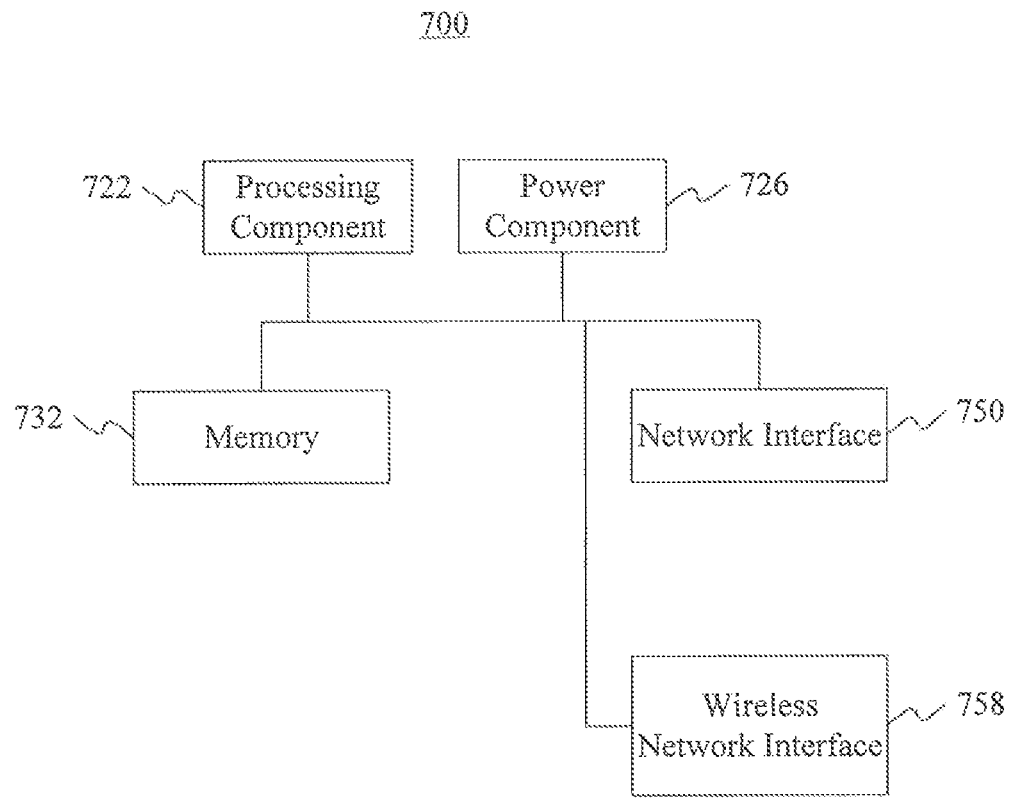
FIG. 7 is a block diagram of a device for adjusting a state of a wireless network, according to an exemplary embodiment.

FIG. 7 is a block diagram of a device 700 for adjusting a state of a wireless network, according to an exemplary embodiment. For example, the device 700 may be provided as a wireless router. Referring to FIG. 7, the device 700 includes a processing component 722 including one or more processors, storage resources represented by a memory 732 for storing instructions executable by the processing component 722, such as application programs, a power component 726 configured to manage power supply of the device 700, a wired or wireless network interface 750 configured connect the device 700 to a network, and a wireless network interface 758 configured connect the device 700 to a wireless terminal. The application programs stored in the memory 732 may include one or more modules each corresponding to a set of instructions. In addition, the processing component 722 is configured to execute instructions to perform the above described methods for adjusting a state of a wireless network. The device 700 may operate under an operating system stored in the memory 732, such as Windows Server™, Mac OS X™, Unix™, Linux™, FreeBSD™, and the like.

In exemplary embodiments, there is also provided a non-transitory computer-readable storage medium including instructions, such as included in the memory 732, executable by the processing component 722 in the device 700, for performing the above described methods. For example, the non-transitory computer-readable storage medium may be a ROM, a RAM, a CD-ROM, a magnetic tape, a floppy disc, an optical data storage device, and the like.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of sub-modules.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure should only be limited by the appended claims.

What is claimed is:

1. A method for a wireless router to adjust a state of a wireless network provided by the wireless router, comprising:
  monitoring whether the state of the wireless network satisfies an adjusting condition of adjusting the state of the wireless network;
  when the state of the wireless network satisfies the adjusting condition, sending an adjusting prompt to a wireless terminal, the adjusting prompt being configured to ask for user permission to adjust the state of the wireless network; and
  if the wireless router receives from the wireless terminal an acceptance instruction to accept the adjusting, adjusting the state of the wireless network,
  wherein the adjusting of the state of the wireless network comprises: when the wireless router receives from the wireless terminal an acceptance instruction to accept the adjusting, switching a first communication channel currently used to a second communication channel, and reestablishing a connection with the wireless terminal on the second communication channel.

2. The method according to claim 1, wherein the monitoring comprises:
  monitoring whether a channel quality of the first communication channel of the wireless network currently used to communicate with the wireless terminal is lower than a preset channel quality.

3. The method according to claim 1, wherein the monitoring comprises:
  monitoring whether a signal intensity of a signal received from the wireless terminal is lower than a preset signal intensity.

4. The method according to claim 1, wherein the monitoring comprises:
  monitoring whether a signal intensity of a signal transmitted by the wireless router is larger than a minimum signal intensity required by a space where the wireless router is located.

5. The method according to claim 3, wherein the adjusting of the state of the wireless network comprises:
  increasing a signal intensity of a signal transmitted by the wireless router to a preset value.

6. The method according to claim 4, wherein the adjusting of the state of the wireless network comprises:
  decreasing the signal intensity of the signal transmitted by the wireless router, to be equal to or larger than the minimum signal intensity.

7. The method according to claim 1, wherein the sending of the adjusting prompt comprises:
  sending the adjusting prompt including at least one of state information of the wireless network and adjusting result information.

8. A wireless network device for providing a wireless network, comprising:
  a processor; and
  a memory for storing instructions executable by the processor,
  wherein the processor is configured to:
    monitor whether a state of the wireless network satisfies an adjusting condition of adjusting the state of the wireless network;
    when the state of the wireless network satisfies the adjusting condition, send an adjusting prompt to a wireless terminal, the adjusting prompt being configured to ask for user permission to adjust the state of the wireless network; and
    if the wireless network device receives from the wireless terminal an acceptance instruction to accept the adjusting, adjust the state of the wireless network,
    wherein, in adjusting the state of the wireless network, the processor is further configured to: when the processor receives from the wireless terminal the acceptance instruction to accept the adjusting, switch a first communication channel currently used to a second communication channel, and reestablish a connection with the wireless terminal on the second communication channel.

9. The wireless network device according to claim 8, wherein the processor is further configured to:
  monitor whether a channel quality of the first communication channel of the wireless network currently used to communicate with the wireless terminal is lower than a preset channel quality.

10. The wireless network device according to claim 8, wherein the processor is further configured to:
  monitor whether a signal intensity of a signal received from the wireless terminal is lower than a preset signal intensity.

11. The wireless network device according to claim 8, wherein the processor is further configured to:
  monitor whether a signal intensity of a signal transmitted by the wireless router is larger than a minimum signal intensity required by a space where the wireless network device is located.

12. The wireless network device according to claim 10, wherein the processor is further configured to:
  increase a signal intensity of a signal transmitted by the wireless network device to a preset value.

13. The wireless network device according to claim 11, wherein the processor is further configured to:
  decrease the signal intensity of the signal transmitted by the wireless network device, to be equal to or larger than the minimum signal intensity.

14. The wireless network device according to claim 8, wherein the processor is further configured to:
  send the adjusting prompt including at least one of state information of the wireless network and adjusting result information.

15. A non-transitory storage medium having stored therein instructions that, when executed by one or more processors of a wireless router providing a wireless network, cause the wireless router to perform:
  monitoring whether a state of the wireless network satisfies an adjusting condition of adjusting the state of the wireless network;
  when the state of the wireless network satisfies the adjusting condition, sending an adjusting prompt to a wireless terminal, the adjusting prompt being configured to ask for user permission to adjust the state of the wireless network; and
  if the wireless router receives from the wireless terminal an acceptance instruction to accept the adjusting, adjusting the state of the wireless network,
  wherein the adjusting of the state of the wireless network comprises: when the wireless router receives from the wireless terminal an acceptance instruction to accept the adjusting, switching a first communication channel currently used to a second communication channel, and reestablishing a connection with the wireless terminal on the second communication channel.

* * * * *